United States Patent
Diekmeyer et al.

(10) Patent No.: US 8,583,339 B2
(45) Date of Patent: Nov. 12, 2013

(54) METHOD AND COMPUTER PROGRAM PRODUCT FOR PREVENTING A VEHICLE FROM ROLLING AWAY

(75) Inventors: Heinrich Diekmeyer, Barsinghausen (DE); Detlev Eggebrecht, Hannover (DE); Konrad Feyerabend, Hannover (DE)

(73) Assignee: WABCO GmbH, Hannover (DE)

(*) Notice: Subject to any disclaimer, the term of this patent is extended or adjusted under 35 U.S.C. 154(b) by 119 days.

(21) Appl. No.: 13/500,535

(22) PCT Filed: Nov. 11, 2010

(86) PCT No.: PCT/EP2010/006870
§ 371 (c)(1),
(2), (4) Date: Apr. 5, 2012

(87) PCT Pub. No.: WO2011/063897
PCT Pub. Date: Jun. 3, 2011

(65) Prior Publication Data
US 2012/0203437 A1 Aug. 9, 2012

(30) Foreign Application Priority Data
Nov. 27, 2009 (DE) .......................... 10 2009 055 921

(51) Int. Cl.
*B60T 7/00* (2006.01)
(52) U.S. Cl.
USPC ............ 701/70; 340/453; 303/9.66; 303/157; 303/192

(58) Field of Classification Search
USPC ......... 701/70; 340/457.3, 453; 303/9.66, 127, 303/157, 191, 192; 180/271
See application file for complete search history.

(56) References Cited

U.S. PATENT DOCUMENTS

| | | | | |
|---|---|---|---|---|
| 4,877,294 A * | 10/1989 | Kuhn et al. | | 303/9 |
| 4,900,098 A * | 2/1990 | Kuhn et al. | | 303/1 |
| 5,791,750 A * | 8/1998 | Spiegelberg | | 303/191 |
| 5,979,619 A | 11/1999 | Rump | | |
| 7,513,341 B2 * | 4/2009 | Lachermeier | | 188/170 |
| 7,628,459 B2 | 12/2009 | Herges | | |
| 7,690,735 B2 * | 4/2010 | Bennett | | 303/9.66 |

(Continued)

FOREIGN PATENT DOCUMENTS

| | | |
|---|---|---|
| DE | 196 11 359 C1 | 8/1997 |
| DE | 10 2005 023 665 A1 | 11/2006 |
| DE | 10 2007 014 427 A1 | 9/2008 |

*Primary Examiner* — Russell Frejd
(74) *Attorney, Agent, or Firm* — Kramer Levin Naftalis & Frankel LLP

(57) ABSTRACT

For a vehicle equipped with a self-braking system (for example, ASR, ESP, FDR, EBS), a service brake, a parking brake, and at least one associated pressure sensor for detecting at least one pressure in the vehicle brake circuit, the brake circuit comprising a compressed-air circuit, a process to prevent the vehicle from rolling away includes determining whether a pressure in the compressed-air circuit from which the parking brake is fed is below a release threshold, and operating the service brake if the pressure in the compressed-air circuit is below the release threshold.

14 Claims, 3 Drawing Sheets

(56) References Cited

U.S. PATENT DOCUMENTS

| | | | |
|---|---|---|---|
| 7,845,474 B2 * | 12/2010 | Schodrowski et al. | 188/153 D |
| 8,044,788 B2 * | 10/2011 | Lundgren et al. | 340/457.3 |
| 8,196,719 B2 * | 6/2012 | Mayrhofer | 188/250 B |
| 8,197,014 B2 * | 6/2012 | Bensch et al. | 303/9.66 |
| 8,282,173 B2 * | 10/2012 | Forster et al. | 303/7 |
| 8,500,216 B2 * | 8/2013 | Bensch et al. | 303/115.2 |
| 2005/0029859 A1 * | 2/2005 | Bensch et al. | 303/89 |
| 2009/0256416 A1 * | 10/2009 | Bensch et al. | 303/17 |
| 2010/0025141 A1 * | 2/2010 | Bensch et al. | 180/271 |
| 2010/0244550 A1 * | 9/2010 | Hilberer | 303/15 |

* cited by examiner

METHOD AND COMPUTER PROGRAM PRODUCT FOR PREVENTING A VEHICLE FROM ROLLING AWAY

FIELD OF THE INVENTION

The present invention generally relates to a method for preventing a vehicle from rolling away. The vehicle is equipped with a self-braking system (for example, ASR, ESP, FDR, EBS), a compressed-air processing system (APU), such as an electronic compressed-air processing system (E-APU), and at least one associated pressure sensor for detecting at least one pressure in the vehicle's brake circuit.

BACKGROUND OF THE INVENTION

In some countries, such as Scandinavian countries, it is a legal requirement for the parking brake of a vehicle to be releasable when filling compressed air only if the vehicle driver performs this action manually, that is, by operating a lever, valve, or switch, for example. This is intended to prevent the vehicle from rolling away without the vehicle driver. Although preventing the vehicle from rolling away is not necessarily a legal requirement, vehicle drivers, in particular in Scandinavia, have become accustomed to this safety function, and therefore vehicle manufacturers continue to provide this functionality.

A dangerous situation of this kind can occur, for example, in the case of a utility vehicle that is braked using compressed air, if the vehicle has been parked on an incline and the compressed-air storage means have been depressurized overnight. Although the vehicle is held in its existing position by the parking brake, which is designed as a spring-loaded brake, by virtue of spring force, as soon as the vehicle driver starts the engine of the vehicle, the compressed-air storage means are filled in a defined order. In the process, the compressed-air storage means of the service brake circuits are usually first filled with compressed air in order to ensure that the vehicle can be braked at any time. The spring-loaded brake would only then be supplied with compressed air, resulting in the release of the spring-loaded brake. Therefore, if the vehicle driver were to start the engine and wished to release the parking brake by means of an operating device in the cab of the vehicle, the vehicle would not begin to move since the compressed-air storage means of the service brake circuit first have to be filled. If the vehicle driver then leaves the cab in order, for example, to find the fault preventing the vehicle from moving away or, for example, to clean the windshield, the compressor that supplies compressed air to the compressed-air storage means would continue to deliver compressed air during this time. As soon as the compressed-air storage means of the service brake circuits are filled, the parking brake would then also be supplied with compressed air, which would release the parking brake and allow the vehicle to move. There is a danger here of the vehicle driver and/or other people being run over by the driverless vehicle.

In order to prevent this, various mechanical solutions employing further pneumatic valves have been provided to date. One disadvantage of a mechanical solution of this kind is that different systems have to be provided for different countries, resulting in higher costs being incurred.

SUMMARY OF THE INVENTION

Generally speaking, it is an object of the present invention to provide a cost-effective method and computer program product for preventing a vehicle from rolling away.

In an advantageous embodiment of the present invention, the pressures are read into the electronic braking system (EBS) from the parking brake circuit by means of independent sensors or by means of electrically modulated signals or preferably by means of a data bus (for example, a CAN bus standardized in accordance with SAE J 1939, Air Supply Pressure message, from the E-APU).

In a further embodiment of the present invention, the method is implemented in the E-APU by the pressures being read into the E-APU from the parking brake circuit by means of sensors and being evaluated by the electronics of the E-APU. If the service brake is intended to be applied, the E-APU sends a signal to the electronic braking system (EBS).

In another embodiment of the present invention, the method is realized in an independent controller that communicates with the electronic compressed-air processing system and the self-braking system.

In a further embodiment of the present invention, the electronic compressed-air processing and the self-braking systems are combined to form one device, and a method according to the inventive embodiments is implemented in this device.

In the following text, an electronic compressed-air processing system is always assumed to be used, wherein all that is required for the inventive methods described herein is that information, that is, pressure values, at least of one service brake circuit are present, making it possible to draw conclusions on the pressure in the parking brake circuit. Therefore, the inventive methods described herein can also be applied to vehicles that can determine at least one pressure value of a service brake circuit and that additionally include a self-braking system.

The term "self-braking system" is intended to refer to brake systems that allow the vehicle to be braked automatically, that is without the involvement of the vehicle driver. For example, known vehicle dynamics control systems (FDR), or electronic stability programs (ESP), and transmission slip control systems (ASR) are examples of such self-braking systems. So-called electronic braking systems (EBS) are also a self-braking system of this kind, provided that the vehicle can be automatically braked.

The term "release threshold" is intended to refer to the pressure that must be present at least in the parking brake, which can be in the form of a spring-loaded brake cylinder, so that the parking brake can be reliably released. This ensures that the vehicle driver, if he wishes to release the parking brake, can release the parking brake and can immediately drive away with the vehicle. This prevents the situation where the parking brake is unreleasable due to an excessively low pressure in the parking brake circuit, which could cause the vehicle driver to leave the vehicle. By way of example, a pressure value of approximately 4 bar can be used as a release threshold. It goes without saying that this release threshold can be set at different levels depending on the vehicle parameters, for example, vehicle weight, trailer operation, etc. Therefore, the release threshold can range from approximately 1 bar to approximately 6 bar depending on vehicle parameters. The release threshold is preferably approximately 4 bar.

Still other objects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

Exemplary embodiments of the present invention will be described in more detail below with reference to the appended drawing figures, in which.

DETAILED DESCRIPTION OF THE PREFERRED EMBODIMENTS

Figure 1:
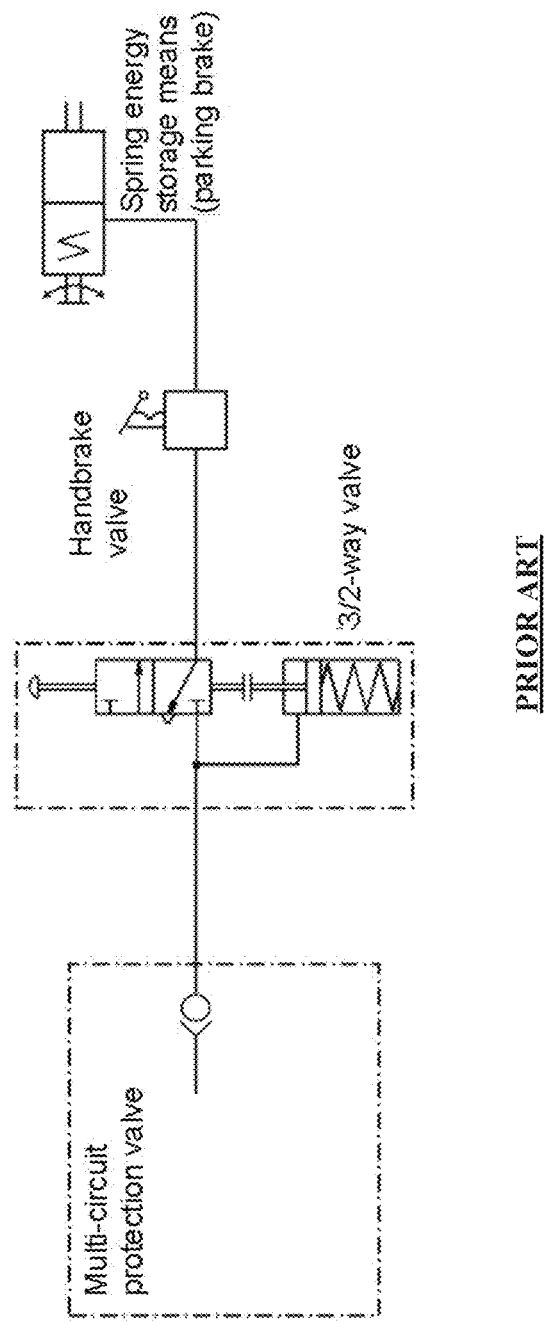
FIG. 1 shows a first known solution for preventing a vehicle from rolling away by means of a pneumatic valve.

FIG. 1 shows a first known solution utilizing a pneumatic valve, which is illustrated as a 3/2-way valve, in the parking brake circuit, wherein the pneumatic valve closes if the pressure in the parking brake circuit, that is, the compressed-air storage means from which the parking brake is supplied with compressed air, falls below a specific pressure threshold. Therefore, in order to be able to release the parking brake, the parking brake (illustrated as a handbrake valve) and the pneumatic valve must first be manually operated.

Figure 2:
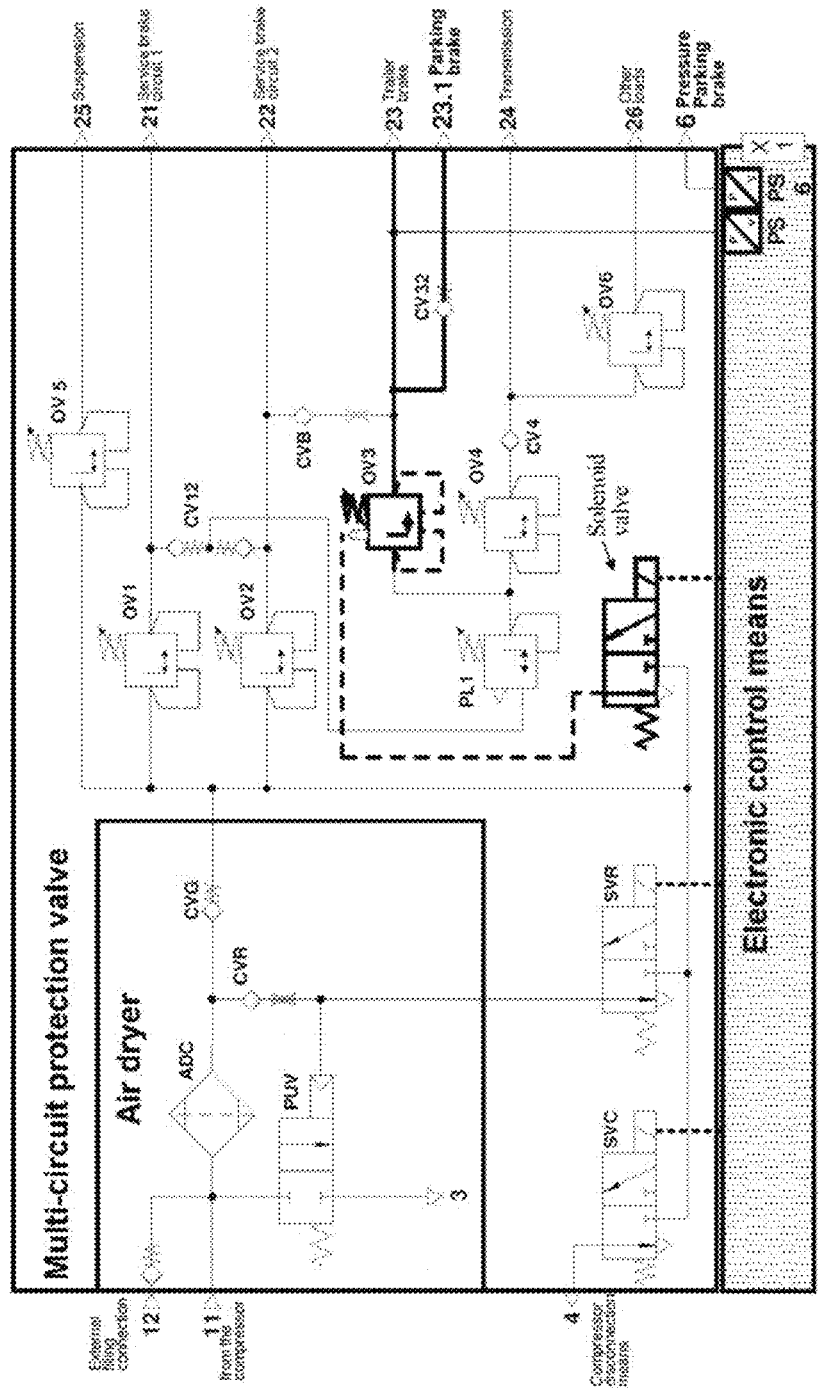
FIG. 2 shows a second known solution for preventing a vehicle from rolling away by means of a solenoid valve.

FIG. 2 shows a second known solution utilizing a solenoid valve, wherein the solenoid valve, in the operated state, prevents the circuit 23 or 23.1 (parking brake circuit) from being filled. In this case, an electronic control switches the solenoid valve if the pressure in the parking brake drops.

Figure 3:
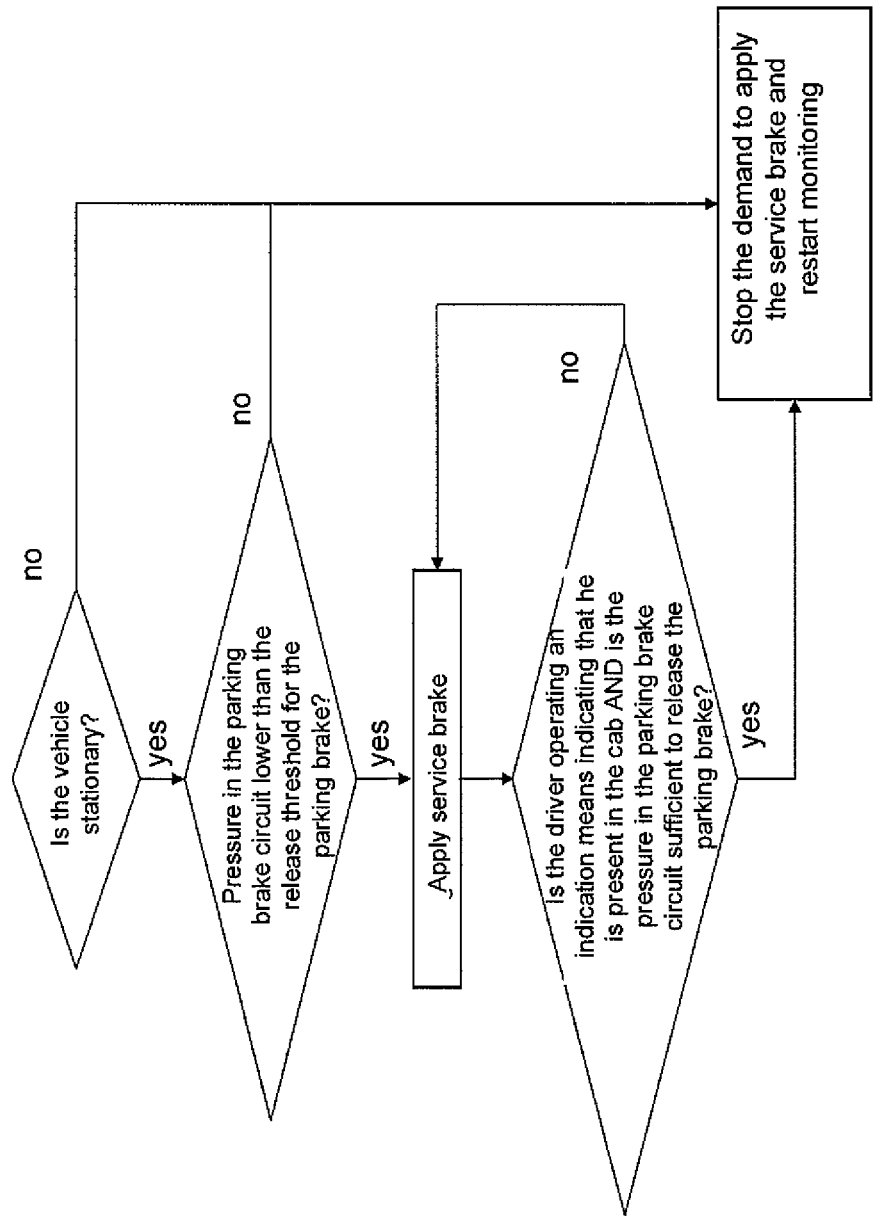
FIG. 3 is a flowchart of a solution for preventing a vehicle from rolling away according to an embodiment of the present invention.

FIG. 3 is a flowchart of a solution for preventing a vehicle from rolling away, according to an exemplary embodiment of the present invention. As shown in FIG. 3, a check is made in a first step to determine whether the vehicle is stationary ("yes") or moving ("no"). This information can be determined, for example, by means of checking a speed signal (e.g., speedometer signal, wheel rotation speed information). If the vehicle is stationary, a check is made, in a second step, to determine whether the pressure in the parking brake circuit is lower than a release threshold for the parking brake. In this case, the term "release threshold" is intended to refer to the pressure that must be present at least in the parking brake, which can be in the form of a spring-loaded brake cylinder, so that the parking brake can be reliably released. By way of example, a pressure value of approximately 4 bar can be used as a release threshold. If this is the case ("yes"), the service brake is then applied. A check is subsequently made, in a third step, to determine whether the vehicle driver actuates an indicator (for example, in the form of a switch, pushbutton, seat-occupation switch, or pedal) so as to indicate that the driver is present in the vehicle cab. The vehicle can be moved, that is, the service brake is released, only if this operation of the indicator has been carried out and there is sufficient pressure in the parking brake circuit to release the parking brake. The vehicle cannot be moved, and as a result the vehicle is also prevented from rolling away, provided that the driver has not operated the indicator or there is insufficient pressure in the parking brake circuit.

It is not absolutely necessary to check whether the vehicle is stationary; it would also be feasible to only detect whether the pressure in the parking brake circuit is lower than a release threshold for the parking brake.

In this case, the pressure in the parking brake circuit can be determined or at least estimated from pressure signals, for example, from pressure sensors in the respective circuits. It is also possible to at least estimate the pressure in the parking brake circuit from the service brake circuits 21 and 22 and to use the pressure correspondingly.

In a further embodiment of the present invention, it is also possible for the service brake to be released as early as after operation of the indicator by the vehicle driver since, at this time, the driver is in the cab, and a check is only then made to determine whether there is enough pressure in the parking brake circuit to release the parking brake. If there is insufficient pressure in the parking brake circuit, the service brake can be operated again so as to prevent the vehicle from rolling away if the vehicle driver has left the vehicle in the meantime.

In another embodiment of the present invention, provision is also made for the service brake to be applied only if it is detected that the vehicle has started to roll.

The described method embodiments therefore provide a standstill safety function by making demands of the service brake. This provides a more cost-effective implementation functionality in comparison to conventional solutions, since the solution according to the inventive embodiments can be realized purely by software in a self-braking system.

By way of example, an electronic braking system (EBS) can, after the system is started, monitor the pressures in the parking brake circuit that are sent by the electronic compressed-air processing system (or other device). If a pressureless/low-pressure system in line with the criteria of the standstill safety function described herein is detected, the service brake is independently braked (for example, by opening the inlet valve into the axle modulators) by means that are available to the electronic braking system.

By way of example, the electronic compressed-air processing system evaluates the pressures and, if the condition for standstill safety functioning is detected, sends a message to the self-braking system so that the service brake is applied. The self-braking system evaluates this message and brakes the vehicle with the service brake for as long as the message is sent.

Instead of a message, an analog signal line can also be used between the electronic compressed-air processing system and the self-braking system.

By way of example, a so-called XBR (eXternal Brake Request) can be used as a standardized CAN SAE J1939 message.

Therefore, if a pressureless system is detected, that is, no pressure is detected in the compressed-air containers of the service brake circuits of the vehicle, and when the vehicle is at a standstill (for example, after the electronic compressed-air processing means is switched on, the pressure in the parking brake circuit is lower than 4 bar), the self-braking system in the vehicle then brakes the vehicle independently, that is, without the vehicle driver, using the service brake. This prevents the vehicle from rolling away when the system is being filled. The service brake is released only if the driver's presence in the cab is indicated (e.g., via an indicator), for example, by operating the brake or clutch pedal or by depressing the accelerator, and the parking brake circuit has sufficient pressure.

In this case, the service brake has to be supplied with air (e.g., that is filled) until there is enough pressure in the system for the service brake to reliably hold the vehicle. Under certain circumstances, this is the case only after a certain time if the compressor has built up enough pressure in the service brake circuits. Since at least one service brake circuit is filled before the parking brake circuit in accordance with the prior art, reliable braking of the vehicle is ensured by means of the service brake circuit before the parking brake opens.

Communication between the respective controllers, for example, between the controller of the electronic compressed-air processing system and the controller of the self-braking system, can be ensured by no message/signal being sent to the self-braking system in the event of a loss of electrical power to the electronic compressed-air processing system. In this way, the self-braking system also operates the service brakes, which can prevent the vehicle from moving or rolling away.

If the electrical power is lost (e.g., which can be detected if there are no corresponding CAN messages) to the self-braking system, the electronic compressed-air processing system can discharge pressure (for example, by means of the "purge valve") or switch off the compressor so as to prevent the vehicle from building up pressure in the parking brake, which could release the parking brake. This again prevents the vehicle from rolling or moving away.

Advantageously, a cost saving is achieved by the described safety function being realized by adapting the software in an existing electronic compressed-air processing system in conjunction with a self-braking system. Furthermore, no additional mechanical components are required. A solution that is carried out by means of software further provides the advantage that it can be implemented rapidly in existing mass-produced products. Furthermore, it has the advantage that an improvement in respect of quality is achieved by virtue of a reduction in complexity, that is, fewer components, which could potentially fail.

In a further embodiment of the present invention, provision is made for the service brake to be automatically operated each time the vehicle is started ("Ignition on"), independently of the existing pressure in the system.

In another embodiment of the present invention, the service brake is operated only after the vehicle is started ("Ignition on"), and not after each time the vehicle is stopped. In this way, the switching conditions for the operation of the service brake according to the standstill safety function presented here are not rechecked every time.

It should be understood that the described embodiments can be combined with one another, provided that they do not contradict one another.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for preventing a vehicle from rolling away, the vehicle being equipped with a self-braking system, a service brake, a parking brake, and at least one pressure sensor in at least one brake circuit of the vehicle, the at least one brake circuit comprising a compressed-air circuit, the method comprising the steps of:
    determining whether a pressure in the compressed-air circuit from which the parking brake is fed is below a release threshold; and
    operating the service brake if the pressure in the compressed-air circuit is below the release threshold.

2. The method as claimed in claim 1, further comprising determining whether the vehicle is stationary.

3. The method as claimed in claim 1, further comprising detecting whether the vehicle is beginning to roll, wherein operating the service brake occurs only in response to detecting that the vehicle is beginning to roll.

4. The method as claimed in claim 1, further comprising determining whether a driver of the vehicle has operated a vehicle indicator.

5. The method as claimed in claim 4, further comprising releasing the service brake if it is determined drat the vehicle driver has operated the indicator.

6. The method as claimed in claim 5, wherein releasing the service brake occurs only if the pressure in the compressed-air circuit is sufficient to release the parking brake.

7. The method as claimed in claim 2, wherein determining whether the vehicle is stationary is based on at least one of a speed signal, a speedometer signal, and a wheel rotation speed sensor signal.

8. The method as claimed in claim 1, wherein the release threshold is a pressure value in the range of approximately 1 bar to approximately 6 bar.

9. The method as claimed in claim 1, wherein the release threshold is a pressure value of 4 bar.

10. The method as claimed in claim 4, wherein the indicator comprises one of a switch, a pushbutton, a seat-occupation sensing device, and a pedal.

11. The method as claimed in claim 1, wherein operating the service brake occurs only after the vehicle is started ("Ignition on").

12. A computer program product comprising a non-transitory computer usable physical medium storing a computer readable program code for causing an application program to executes the method as claimed in claim 1.

13. An electronic compressed-air processing system, comprising a controller configured to implement the method as claimed in claim 1.

14. A self-braking system, comprising a controller configured to implement the method as claimed in claim 1.

* * * * *

UNITED STATES PATENT AND TRADEMARK OFFICE
CERTIFICATE OF CORRECTION

| | | |
|---|---|---|
| PATENT NO. | : 8,583,339 B2 | Page 1 of 1 |
| APPLICATION NO. | : 13/500535 | |
| DATED | : November 12, 2013 | |
| INVENTOR(S) | : Heinrich Diekmeyer et al. | |

It is certified that error appears in the above-identified patent and that said Letters Patent is hereby corrected as shown below:

In the claims:

Claim 5, in column 6, line 23: delete "drat" and insert --that--

Claim 12, in column 6, line 46: delete "executes" and insert --execute--

Signed and Sealed this
Twenty-fifth Day of March, 2014

Michelle K. Lee
*Deputy Director of the United States Patent and Trademark Office*